Patented Dec. 27, 1927.

1,654,176

UNITED STATES PATENT OFFICE.

HENRY ADOLPH KOHMAN, ROY IRVIN, AND ERNEST SALATHIAL STATELER, OF PITTS-BURGH, PENNSYLVANIA, ASSIGNORS TO GEORGE S. WARD, OF NEW YORK, N. Y.

METHOD OF COAGULATING OR CURDING MILK.

No Drawing.      Application filed October 3, 1921. Serial No. 505,126.

For commercial purposes, the coagulation or curding of milk has heretofore been principally accomplished by means of rennet, a product of animal origin.

The present invention involves the discovery that milk may be coagulated or curded by means of enzymes produced by the growth of the fungus *Mucor rouxii* upon a suitable culture medium,—preferably rice.

In practice it will be preferable and desirable to select as the material upon which the *Mucor rouxii* is grown, either polished or unpolished rice, polished rice being chosen in those instances where it is of importance to have the resulting product, when used in the form of a powder, as nearly white as possible. In fact, in the powdered form, whether the rice employed is polished or unpolished, the product obtained by grinding up the rice with the *Mucor rouxii* grown upon it is particularly well adapted for commercial purposes because of its keeping qualities and its convenience of use. It will be understood, however, as hereinafter more fully set forth, that after the growth of the *Mucor rouxii* upon the rice or like material, the enzymes may be extracted by water and the water solution used as such, either with or without concentration.

The rice is prepared for use as the medium upon which to grow the *Mucor rouxii* by cooking it with about 75% of its weight with water, (or preferably with 75% of its weight of about equal parts of water and milk) until the liquid has been absorbed by the rice kernels. The use of milk either as such or an equal amount of milk powder is found to materially add to the strength of the ultimate enzyme product to be obtained. The mass is then permitted to cool and is then inoculated sufficiently with the spores of the *Mucor rouxii*. The inoculated mass is then subjected to conditions suitable for the growth of the *Mucor rouxii* spores. For instance, if the final product is to be made up by grinding the fungus grown upon the rice, together with the rice upon which the fungus is grown, it will be preferable to spread out the inoculated rice in layers of say from 1″ to 2″ in shallow pans which, for convenience, may have a superficial area of three to four square feet. The pans containing the material should then be covered over with the exception of a marginal space of about one-eighth to one-quarter-inch, for the purpose of correspondingly restricting the free access of air and consequently delaying the formation of spores, which being of a dark color, would tend to impart an undesirable grayish tint to the product if present in too large a quantity. The growth of the fungus upon and within the rice is manifested by the propagation of the mycelium which extending through the mass will bind the layer into a more or less coherent cake, the growth of the spores upon the mycelium being appropriately restricted in the manner above indicated. It will, of course, be understood by those skilled in the art that appropriate temperature conditions are to be observed in connection with restricted aeration necessary in order to arrive at the completion of the growth of the fungus in and throughout the rice base within a suitable period of time, which will usually be about two days. The cake consisting of the rice base with the network of mycelium binding it together and such spores as are present is then removed from the pans. The cake is then torn apart or otherwise disintegrated and dried, and is thereupon ground to a fine powder, preferably of 200 mesh, so that, in subsequent use, the enzymes present will readily go into solution in the milk to be coagulated or curded.

The finely powdered product thus obtained is utilized in the coagulating or curding of milk by stirring into the milk an appropriate amount depending upon its coagulating strength. The coagulating strength of the product will usually be fairly uniform, although it may vary under different conditions of production. So also, the amount to be used in any particular instance will depend in a large measure upon the time within which it is desired to effect the coagulation or curding of the milk. For instance, in practice, it will be found that where, as in the marking of desserts, or in the making of ice cream, it is desirable to produce the coagulating or curding within a relatively short period of time, say from two to four minutes, this can easily be accomplished by stirring into the milk from ½% to 2% of the powdered product. Where (as, for instance in the making of cheese on a large scale) it is desirable to economize in the amount of material employed, an amount of the powdered product may be used which will be effective to bring about the coagulation or curding of the milk in a longer period of time; in other words, the time period within which coagulation or curding may be effected will depend upon the amount of the material used, or vice versa, the amount of material used may be increased in order to diminish the time period.

It is a marked characteristic of the present invention that it places at the disposition of the user a product, of vegetable origin, which can be used at least as effectively as most of the commercial rennets in the coagulation or curding of milk, and within a time period which renders it available for application for all of the purposes for which rennet is employed in the arts, including particularly, domestic or household use where quick results are, in most instances, desirable and even necessary.

In some cases, it may be preferred to employ a liquid product, instead of the ground product hereinbefore particuarly described. In these instances, no particular care need be taken to restrict the production of spores during the incubation of the inoculated product. In fact, in such cases, free access of air may be given to the body of the inoculated material by placing it in pans having perforated or screen bottoms and freely open at the top, thereby insuring a stronger or more prolific growth of the mycelium throughout the mass. The cake thus produced will contain a correspondingly larger growth of spores, but it is found that when the cake is then extracted by water, the coloring matter of the spores remains in its substantial entirety in the cake and is not carried into solution with the enzymes in the extracting water. The water employed for extracting the enzymes may then be concentrated, the temperature of concentration being maintained sufficiently low that the activity of the enzymes may not be materially affected. The water extract, either in the concentrated or unconcentrated form, may be sprayed upon or otherwise intermingled with a finely powdered absorbent, such as, for instance, rice flour, and, either with or without further drying will then be available for commercial distribution and use. In fact, the water extract, particularly in the concentrated form may be used per se as the coagulating or curding agent whenever choice or convenience requires, it being borne in mind that the fundamental feature of the invention resides in the discovery that the enzymatic product obtained by the growth of the fungus *Mucor rouxii* upon rice, or other like suitable medium, is effective in any of its forms to coagulate or curd milk so promptly and effectively that it can be looked upon as practically a "vegetable rennet."

It may be said further that the concentrated liquid extract has the advantage of longer keeping qualities under like conditions of storage than the unconcentrated extract, for the reason, among others, that the process of concentration leaves in the final product a larger proportionate amount of sugar which serves as a preserving agent. It would be advisable, in most cases, where the unconcentrated or less highly concentrated water extract is employed as such to keep it under suitable refrigerating or other preservative conditions until used.

We claim:

1. The method of coagulating or curding milk, which comprises adding to the milk the coagulating or curding enzyme product produced by the growth of *Mucor rouxii* upon a suitable medium; substantially as described.

2. The method of coagulating or curding milk, which comprises adding to the milk the coagulating or curding enzyme product produced by the growth of *Mucor rouxii* upon rice to which milk has been added; substantially as described.

In testimony whereof we affix our signatures.

HENRY ADOLPH KOHMAN.
ROY IRVIN.
ERNEST SALATHIAL STATELER.